Figure 1:
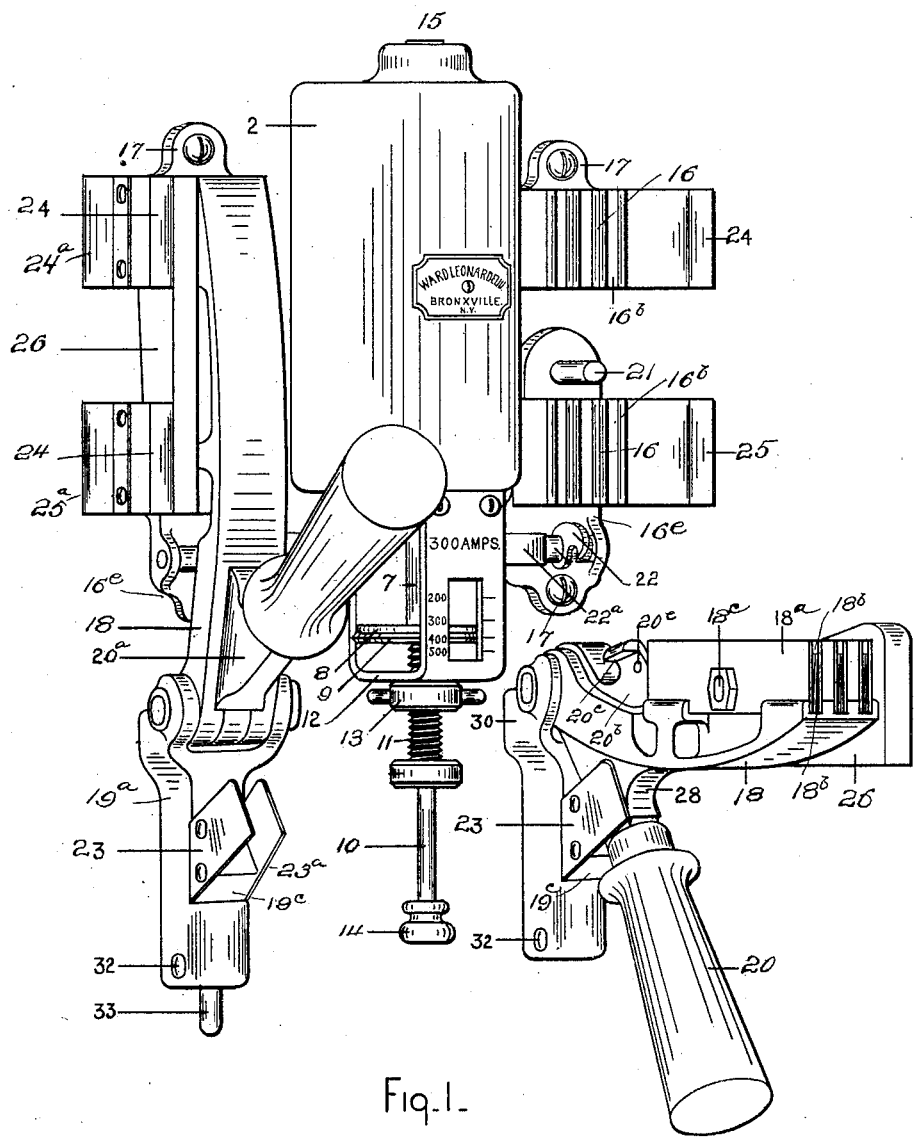

No. 705,102. Patented July 22, 1902.
H. W. LEONARD & H. P. BALL.
ELECTRIC CIRCUIT BREAKER.
(Application filed Apr. 4, 1898.)

(No Model.) 5 Sheets—Sheet 1.

WITNESSES: INVENTORS

No. 705,102. Patented July 22, 1902.
H. W. LEONARD & H. P. BALL.
ELECTRIC CIRCUIT BREAKER.
(Application filed Apr. 4, 1898.)

(No Model.) 5 Sheets—Sheet 2.

No. 705,102. Patented July 22, 1902.
H. W. LEONARD & H. P. BALL.
ELECTRIC CIRCUIT BREAKER.
(Application filed Apr. 4, 1898.)

(No Model.) 5 Sheets—Sheet 3.

No. 705,102. Patented July 22, 1902.
H. W. LEONARD & H. P. BALL.
ELECTRIC CIRCUIT BREAKER.
(Application filed Apr. 4, 1898.)

(No Model.) 5 Sheets—Sheet 4.

Witnesses:

Inventors
Harward Leonard
Henry Prig Ball
by Rich N. Dyer
Att'y.

No. 705,102. Patented July 22, 1902.
H. W. LEONARD & H. P. BALL.
ELECTRIC CIRCUIT BREAKER.
(Application filed Apr. 4, 1898.)

(No Model.) 5 Sheets—Sheet 5.

WITNESSES: INVENTORS

UNITED STATES PATENT OFFICE.

HARRY WARD LEONARD, OF NEW YORK, AND HENRY PRICE BALL, OF MOUNT VERNON, NEW YORK, ASSIGNORS, BY MESNE ASSIGNMENTS, TO H. WARD LEONARD, OF BRONXVILLE, NEW YORK.

ELECTRIC-CIRCUIT BREAKER.

SPECIFICATION forming part of Letters Patent No. 705,102, dated July 22, 1902.

Application filed April 4, 1898. Serial No. 676,411. (No model.)

*To all whom it may concern:*

Be it known that we, HARRY WARD LEONARD, a resident of the borough of Manhattan, city and county of New York, and HENRY PRICE BALL, a resident of Mount Vernon, in the county of Westchester, State of New York, citizens of the United States, have jointly invented a new and useful Improvement in Automatic Electric-Circuit Breakers, of which the following is a description.

Our invention relates to circuit-breakers for automatically opening a circuit upon the occurrence of abnormal conditions in the circuit or upon the occurrence of a predetermined flow of current.

The object of our invention is to provide better switch elements than heretofore provided, to provide a better electroresponsive device for controlling the switch, and to provide means for insuring the instantaneous operation of the switch when the electroresponsive device responds to abnormal conditions.

In circuit-breakers as heretofore constructed the switch can be closed while an excessive current flows or while the line is "short-circuited," and the circuit-breaker will remain closed so long as the operator holds the operating-handle, thus subjecting the apparatus designed to be controlled or protected thereby to the abnormal conditions of the circuit, as well as subjecting the circuit breaker or controlling apparatus to destructive heating and arcing and frequently entirely destroying the apparatus. Another objectionable feature in circuit-breakers as heretofore constructed is that the switch often fails to operate when the electromagnetic controller responds to an overload-current or "short circuit." This is due to the sticking of the switch-blades in the stationary switch-jaws and is true of switches operated both by gravity and spring-pressure. Another objectionable feature is the form of switch-contacts heretofore employed. It is customary to provide one or more stationary switch members and a movable member adapted to enter the stationary member, either the stationary members or the movable member being resilient, so that the movable member will be wedged into the stationary member and produce a heavy frictional engagement. With such constructions, however, perfect contact is not obtained throughout on account of the uneven spreading or compressing of the resilient member—that is to say, if, for instance, the stationary member or members are resilient and the movable member a rigid blade the entrance of the blade will force the stationary members farther apart at the entrance, thus causing them to assume a V shape, which results in a good contact at the lower or inner edge of the blade and a gradually-decreasing degree of frictional engagement toward the outer edge and very frequently producing an air-gap between a comparatively large area of the two switch elements. This condition produces overheating at the contacts. Various forms of wedge-shaped contacts and spring-blades have been proposed to obviate this difficulty; but, so so far as we are aware, none of the constructions heretofore proposed have overcome this objection.

We have overcome the first objection by providing a double-pole circuit-breaker with entirely independent switch-arms, which are designed to be independently closed and independently or simultaneously opened automatically upon the occurrence of an overload-current or short circuit. In such construction if one switch is closed while an excessive current is flowing the electromagnetic device will respond the instant the second switch closes the circuit and effect the opening of the switch first closed. Thus it will be seen that no matter how long the operator may hold the second switch the first one will always operate instantly to open the circuit if an overload exists.

The second objection is overcome by providing means for imparting a blow to the movable switch members when the electromagnetic controller responds to an overload current, the blow serving to start the movable switch members from their stationary contact-jaws, whereupon the final opening of the switch is effected either by spring-pressure or gravity, but preferably by spring-pressure. The devices for imparting blows to the movable switch members are preferably in the form of spring-actuated operating-handles, by means of which the switches are closed against spring-pressure. Mechanical locking devices are preferably provided for locking the switches in closed position. These devices preferably engage with the operating-handles, so that upon the operation of the electromagnetic controller the operating-handles are released and in moving toward the open position impart the blows to the switches. To further insure the opening of the switches, an additional spring is sometimes provided for each switch, said springs exerting pressure directly upon the movable switch members while in the closed position, so that when the movable switch members receive a blow from the operating-handles said springs aid the spring-actuated handles in opening the switches.

The third objection is overcome by our improved switch elements, wherein one element, preferably the stationary member or members, is rigid and the movable member is composed of two or more movable plates arranged parallel to each other and having a spreading device between each plate. The object of the spreading device is to permit a free movement of the plates toward each other and also serves to produce good frictional contact between the plates and stationary switch member. The plates are loosely held by the movable switch-arm, and as they are forced between the stationary switch members the spreaders are uniformly compressed, whereby the switch-plates remain parallel as they move into or between the stationary members, thus producing a uniform and complete contact, there being no wedging action and no tendency to assume V-shaped positions. However, if the adjacent faces of the stationary members were not parallel the movable members would still make perfect contact, because the spreader will force them against the side walls, they being loose and free to assume V-shaped positions, if necessary.

Our invention involves other details of construction, which will be hereinafter more fully described.

Figure 2:
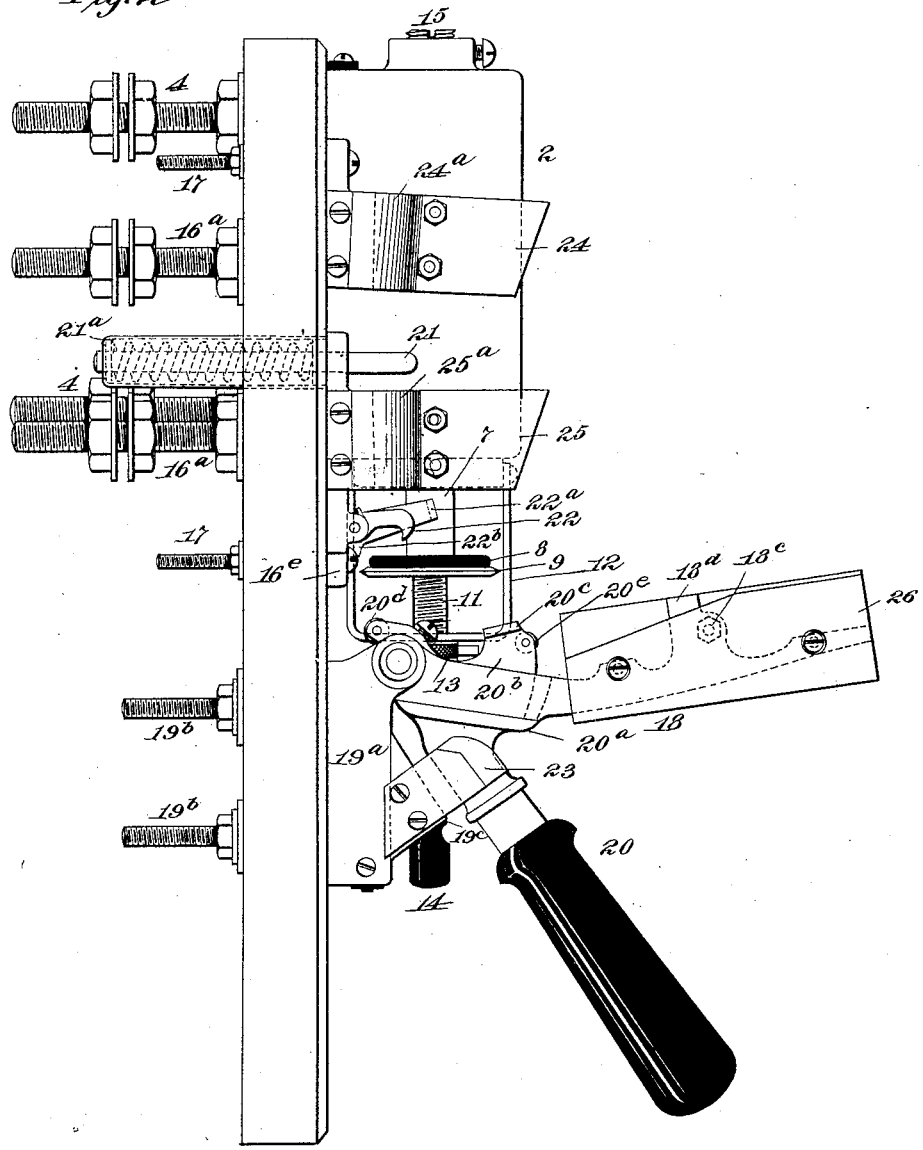
Figure 3:
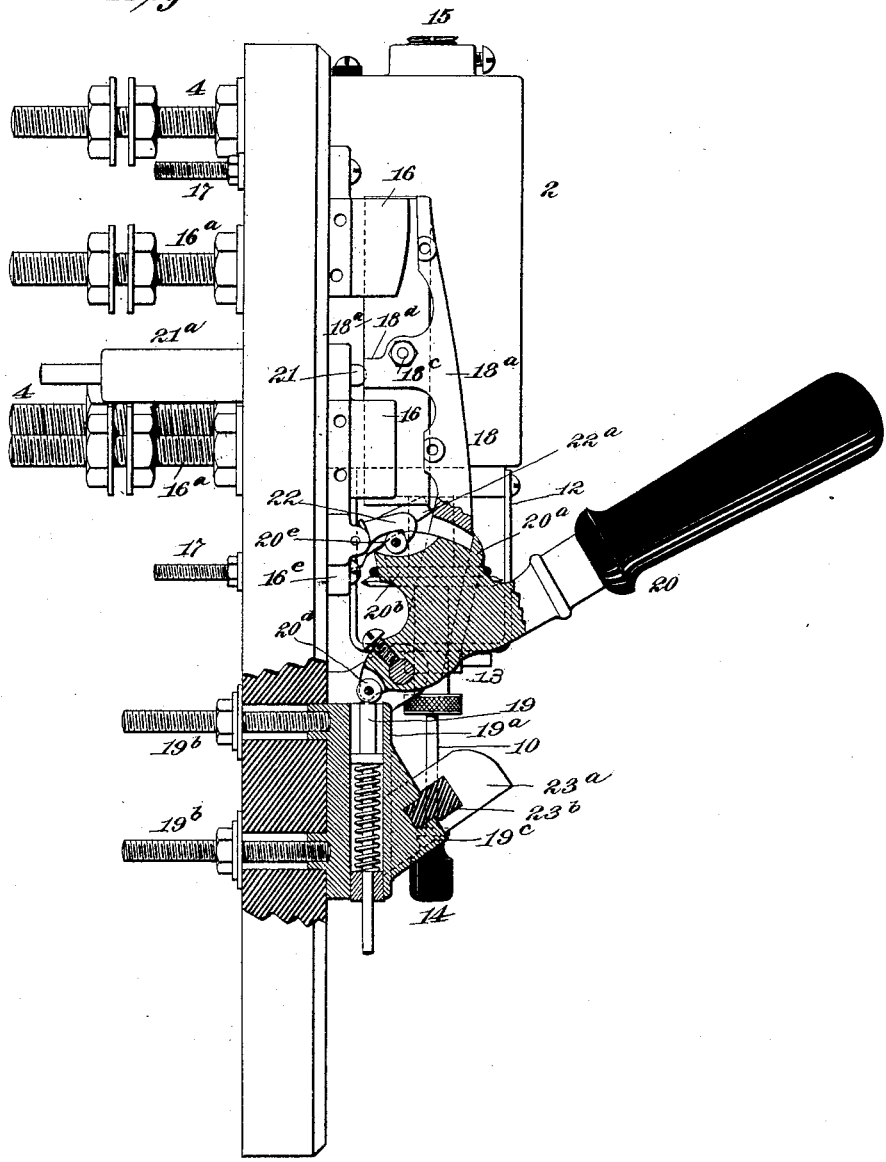
Figure 4:
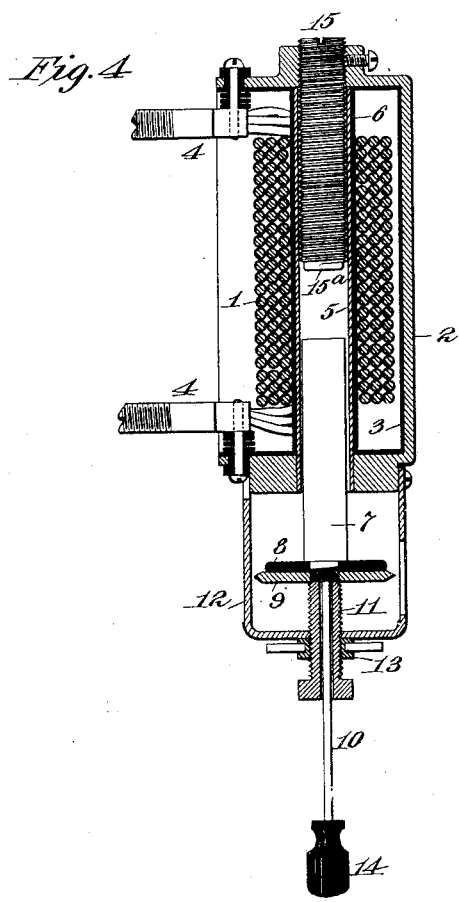
Figure 5:
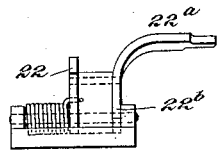
Figure 6:
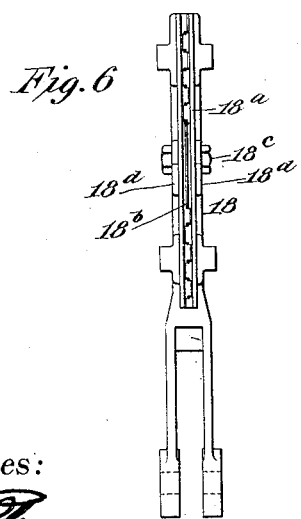
Figure 7:
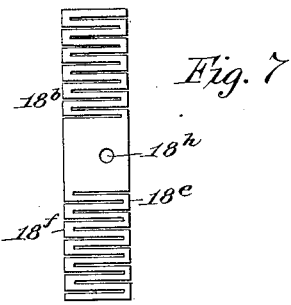
Figure 8:
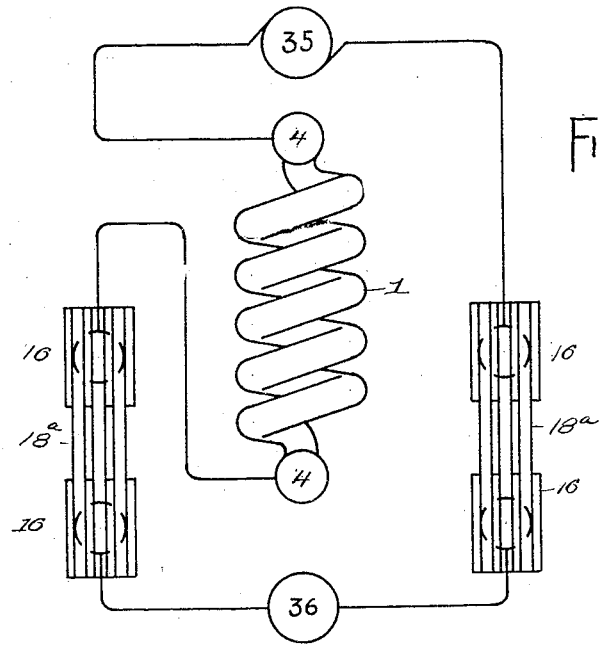
Figure 9:
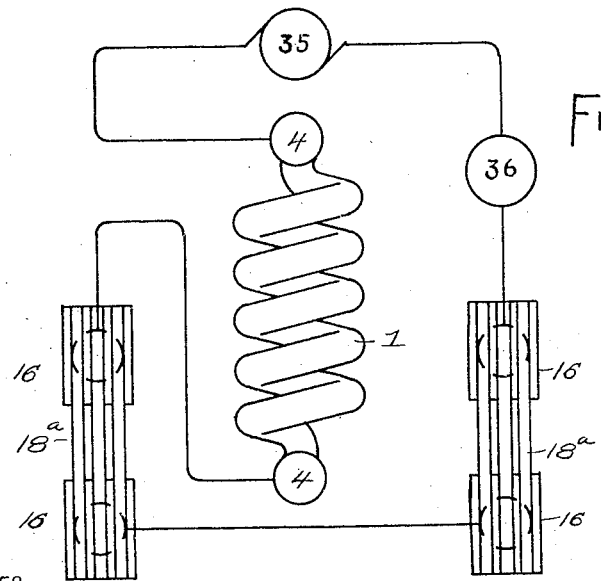

In the accompanying drawings, which illustrate our invention, Figure 1 is a perspective view of a double-pole circuit-breaker embodying our invention, one switch being shown in the open position and the other closed. Fig. 2 is a side elevation showing one switch in the open position, the other switch being omitted for the sake of clearness. Fig. 3 is a side view showing the switch closed, the carbon contact being removed and parts being shown in section. Fig. 4 is a vertical central section of the electromagnetic controller. Fig. 5 is an elevation of the switch-locking device; Fig. 6, an edge view of one of the movable switch members; Fig. 7, a view of the spring or spreader employed between the plates of the movable switch-blades; and Figs. 8 and 9 are diagrams illustrating the manner in which our improved circuit-breaker may be connected in circuit, Fig. 8 showing the usual way of connecting a double-pole switch in circuit, while Fig. 9 shows our preferred arrangement for connecting our double circuit-breaker in high-voltage circuits, such as railway-circuits—that is, the two switch members are connected in series between the source of energy and the controlling device.

The electromagnetic controller comprises a solenoid-coil 1, which is located within an iron casing 2, the inner surface of which is insulated, preferably, by a layer of mica 3. The ends of the coil are connected to the terminals 4, which are secured to the casing 2 and properly insulated, and these terminals pass through the back of the support upon which the parts are mounted. Passing through the coil 1 is a brass tube 5 and also a layer of insulation 6. Within the lower end of the brass tube is the core 7, which works through a hole in the bottom of the casing 2. At its lower end the core 7 is provided with a disk of insulating material 8, held in place by a disk of metal 9. Projecting from the lower end of the core 7 is a rod 10, which passes through the screw-threaded sleeve 11, which is screwed into a stirrup 12, secured to the casing 2. The sleeve 11 is adjustable through the stirrup to limit the lowermost or outward position of the core 7, and 13 is a locking-nut for locking the sleeve 11 in its adjusted position. The lower end of rod 10 is provided with a knob 14 for operating the core 7 by hand when it is desired to open the switches independently of the current.

The front of stirrup 12 is slotted, as shown in Figs. 1 and 4, and provided with graduation-marks, indicating amperes. The edge of the metal disk 9 is beveled, so as to serve as a pointer, coöperating with the graduations on the stirrup 12 and serving to indicate the number of amperes at which the electromagnetic controller will operate. Within the upper end of the tube 5 is a screw-threaded iron rod 15, which screws into the screw-threaded extension at the top of the casing 2 and which rod is provided with a tip 15ª, of non-magnetic material. Rod 15 serves as an adjustable stop for the core 7. The object of this stop is to prevent injury to the locking device when the core operates—that is, the disk 8 is designed to engage the locking device and trip it before the end of its movement—and the upward movement of the core is arrested by the stop 15 before the locking device reaches the limit of its movement, so that the force of the blow will not injure the locking device. By making the stop 15 large and of magnetic material it, with the iron shell 2, greatly increases the magnetism of the solenoid.

Both switch members are identical in construction, and a description of one of them will suffice for both. In the present form of switch two stationary switch-contacts 16 are provided, having extensions 16ª, which pass through the support or switchboard and by means of which and bolts 17 the contacts are held in place. These contacts are rigid metal blocks each having one or more slots 16$^b$, according to the number of switch-blades employed, the form shown in Fig. 1 having three slots and the form shown in Figs. 2 and 3 having one slot. The movable switch member is composed of a pivoted switch-arm 18, carrying one or more switch-blades, each blade comprising a pair of comparatively thin plates 18ª, having a spreading device 18$^b$ between them. In the form shown in Fig. 1 three blades are provided, the plates of each blade being arranged in a pair of slots 18$^i$, formed in the switch-arm. The blades are held in place by a bolt 18$^c$, which passes through the plates and the spreading device and through one or more projections on the switch-arm. In Fig. 1 the projections through which bolt 18$^c$ passes are located between the blades, while in the form shown in Figs. 2, 3, and 6 two projections 18$^d$ are provided, the two plates 18ª and spreader 18$^b$ being placed between them. From this construction it will be seen that each pair of plates when forced into the slots of the stationary contacts will be held firmly against the sides thereof by the spreading devices between the plates, thus forming a perfect contact throughout. It will also be seen that the plates are free to adjust themselves in slots 16$^b$, even if they are slightly out of alinement, and if the walls forming the slots are not parallel the plates will also be free to adjust themselves. It will also be seen that any desired degree of flexibility may be obtained by varying the thickness of the plates, since the proper current-carrying capacity of the blades can be obtained by providing any desired number of plates, and as the number of plates is increased (with good contact at each plate) the heating at the points of contact will be decreased.

The movable switch-arm 18 is pivoted between two arms projecting from a spring-barrel 19ª, secured to the switchboard by bolts 19$^b$, and the pivot end of the switch-arm is slotted to receive the operating-handle 20, which is also pivoted between the two arms. The operating-handle is provided with a flange or shoulder 20ª, which engages the switch-arm to move the same in closing the switch, and the end of the tongue 20$^b$ which passes through the slotted switch-arm is provided with a flange or head 20$^c$, which constitutes the hammer for imparting a blow to the movable switch member to start it from the stationary members. The operating-handle is provided with a slotted projection carrying an antifriction-roller 20$^d$, which engages a spring-actuated plunger 19, working in the barrel 19ª, and as the switch is closed roller 20$^d$ engages with the upper end of the plunger 19, forcing said plunger downward and compressing its spring. It will be seen that as the operating-handle is released this plunger, acting against roller 20$^d$, will force the operating-handle outward and cause the head 20$^c$ to impart a blow to the switch-arm and drive it outward or away from the stationary contacts.

In closing the switch the switch-blades or projections 18$^d$ engage with a spring-pressed plunger 21 and place its spring under increased tension. This plunger works in the barrel 21ª, projecting through the switchboard, as shown in Figs. 2 and 3. When the switch-blades are started from the stationary contacts by the blow of the operating-handle, plunger 21 follows the blades and plunger 19 follows the operating-handle, the effect of both being to greatly increase the momentum of the movable switch member and producing a very rapid separation of the contacts, so rapid, in fact, that very little sparking is caused by the breaking of the circuit. It has been found in actual practice that the break produced by this switch is so rapid that the carbon contacts (hereinafter referred to) may be dispensed with without serious arcing.

The switch is locked by a catch 22, which engages a roller 20$^e$ on the tongue 20$^b$. This catch is secured to a spring-actuated arm 22ª, pivoted between two ears projecting from an extension 16$^e$ of the lower stationary contact member. The spring serves to hold the catch in the locking position. The arm is provided with a projection 22$^b$, which limits the forward movement of the catch, and said arm is of such length as to project into the path of movement of the disk 8 on the core of the electromagnetic controller, so that the upward movement of this disk will tilt the catch and disengage it from the roller 20$^e$ on the tongue of the operating-handle.

To check the opening movement of the operating-handle after the opening of the switch is effected, we provide spring-plates 23 23ª and a rubber cushion 23$^b$, the latter being seated in a shoulder 19$^c$ on the spring-barrel 19ª, and the former are secured to the sides of said shoulder. Spring-plates 23 and 23ª engage the operating-handle with considerable friction and in addition to checking the opening movement of the switch also prevent the operating-handle and the switch-arm from rebounding.

To avoid injury to the metal switch-contacts due to arcing upon the opening of the circuit, we provide a carbon break comprising, preferably, carbon contacts 24 and 25, carried by curved spring-plates 24ª and 25ª, secured to the outer edges of the bases of the stationary switch members, and a carbon switch-plate 26, secured to the outer side of the movable switch-arm, so that in the closed position plate 26 will be between the pair of carbon contacts 24 and 25 and the switch-arm 18 and in close contact with the contacts 24 and 25.

The preferred form of spreader for the switch-plates 18ª is shown in detail in Fig. 7, in which 18ᵇ represents a crenelated spring-metal plate (preferably phosphor-bronze) of the same size as the switch-plates—that is, a plate cut alternately from opposite edges to form a series of connected U-shaped sections, the connected ends or sections 18ᵉ on one edge being bent out of alinement with the corresponding ends or sections 18ᶠ on the opposite edge, as seen in Fig. 6, thus forming a spring-plate pressing evenly along the longitudinal edges of a pair of switch-plates when placed in position on the switch-arm and always tending to hold said switch-plates parallel. The switch-plates and spreader (which in the central section is left solid) are provided with central holes 18ʰ for the bolt 18ᶜ. This bolt is the only means for holding the plates of each switch-blade on the switch-arm, the plates being held in alinement by being placed in shallow slots 18ⁱ, Fig. 1. From the foregoing and by reference to Fig. 1 it will readily be seen that the switch-blades, by reason of their flexibility and adjustability, will be capable of entering the slots of the stationary switch members even if they are not in alinement and that they will be free to adjust themselves to the walls of the stationary contacts whether they be parallel or not.

The open position of the switch is shown in Figs. 1 and 2. In this position the operating-handle is held by the spring-clips 23 23ª and the movable switch-arm 18 is resting upon the flange 20ª. To close the switch, the operating-handle is disengaged from the spring-clips, which movement carries the switch-arm upward and at the same time compresses the spring of plunger 19. As the switch-blades enter the stationary contacts spring-plunger 21 is forced inward, compressing its spring, and when the switch-blades have moved the proper distance into the stationary contacts 16 the latch 22 engages the roller 20ᵈ and locks the switch in the closed position, as shown in Fig. 3.

Under normal conditions the core of the electromagnetic controller will rest in its lowermost position against the screw-sleeve 11, and, as above stated, upon the occurrence of an overload-current of the predetermined amount for which the controller is adjusted the core 7 will be drawn upward, causing the disk 8 to strike the end of arm 22ª of the locking device, tripping the same and effecting the release of the switch-operating handle, whereupon spring-plunger 19 will throw the handle outward, which in its movement will impart a blow to the switch-arm, starting the switch-blades from the stationary contacts, and then the combined pressure of spring-plungers 19 and 21 will effect the final opening movement of the switch. It may be noted that the locking device is also tripped by a blow instead of a steady pull, which makes the release more effective. A steady pull on the locking device might be ineffective to release the catch, while a sharp blow will insure a positive and instantaneous release. It will also be noted that while we have described the elements of our circuit-breaker as applied to the overload type—that is, one operating when the current exceeds a predetermined amount or when a short circuit occurs—it is to be understood that our switch elements are equally as well adapted for use with an underload electroresponsive device—that is, one operating when the current fails or falls below a predetermined amount.

The manner in which our circuit-breaker may be electrically connected in circuit is shown in Figs. 8 and 9, in which 35 represents a dynamo or other source of electric energy, and 36 is the translating device to be protected by the automatic circuit-breaker. In Fig. 8 the connections represent the ordinary double-pole switch connections—i. e., one switch in each side of the circuit. When the circuit-breaker is to be used on high-voltage circuits, such as railway-circuits, we connect the two switches in series between the source and the translating device—i. e., both switches in the same side of the circuit—thus providing four points at which the circuit is broken simultaneously in one side of the circuit, as shown in Fig. 9. With this arrangement the switch members are not subjected to severe arcing, as in the ordinary arrangement, and by employing our form of independently-operating switches we retain the important advantage of our improved switch mechanism—i. e., certain opening of the circuit at the first switch closed immediately upon the closure of the second switch should abnormal conditions exist on the line at the instant the circuit is completed through both switches. Thus all the advantages of a multiple-contact switch are embodied in our improved switch and automatic circuit-breaker.

What we claim is—

1. The combination of a plurality of electric switches designed to be moved manually and independently into normal position, and a single controlling device for automatically controlling the movement of said switches after manual adjustment.

2. The combination of a plurality of electric switches designed to be moved manually and independently into normal position, and a single electroresponsive device for automatically controlling the movement of said switches after manual adjustment.

3. The combination of a plurality of electric switches designed to be moved manually and independently into normal position, and a single electroresponsive device for automatically controlling or effecting the simultaneous movement of said switches after manual adjustment.

4. The combination of a plurality of electric switches designed to be moved manually and independently into normal position, means tending to open said switches, locking devices for holding said switches in their normal positions, and a single electroresponsive device for automatically releasing said switches.

5. The combination of a plurality of electric switches designed to be moved manually and independently into normal position, means tending to open said switches, locking devices for holding said switches in their normal positions, and a single electroresponsive device for automatically and simultaneously releasing said switches.

6. The combination of a plurality of electric switches, means tending to move same out of normal position, a locking device for holding each of said switches in normal position, an automatic controller for effecting the release of said switches, and means operating to impart a blow to said switches to start same when released.

7. The combination of a plurality of electric switches, means tending to move same independently out of normal position, a locking device for holding each of said switches in normal position, an automatic controller for effecting the release of said switches independently or simultaneously, and means operating to impart a blow to said switches to start same when released.

8. The combination of a plurality of electric switches, means tending to move same out of normal position, a locking device for holding each of said switches in normal position, an electroresponsive device for effecting the release of said switches, and means operating to impart a blow to said switches to start same when released.

9. The combination of a plurality of electric switches, means tending to move same independently out of normal position, a locking device for holding each of said switches in normal position, an electroresponsive device for effecting the release of said switches independently or simultaneously, and means operating to impart a blow to said switches to start same when released.

10. In a circuit-controller, the combination of a plurality of switches adapted to be connected in series in one side of an electrical circuit, means for operating said switches, and one electroresponsive device for controlling the operation of said switches.

11. In a circuit-controller, the combination of a plurality of switches adapted to be connected in series in one side of an electrical circuit, means for operating said switches, and one electroresponsive device for simultaneously controlling the operation of said switches.

12. In a circuit-controller, the combination of a plurality of switches adapted to be connected in series in one side of an electrical circuit, means for operating said switches, independent means for holding each switch closed under normal conditions, and one electroresponsive device operating under abnormal conditions to effect the release of said switches.

13. In a circuit-controller, the combination of a plurality of switches adapted to be connected in series in one side of an electrical circuit, means for operating said switches independently, and means common to each of said switches operating under abnormal conditions in the circuit to cause one or all of said switches when closed to open automatically upon the completion of the circuit.

14. In a circuit-controller, the combination of a plurality of switches adapted to be connected in series in one side of an electrical circuit, means for operating said switches independently, independent means for maintaining each switch closed under normal conditions, and an electroresponsive device operating under abnormal conditions in the circuit to cause the release of one or all of said switches when closed to open automatically upon the completion of the circuit.

15. In an automatic circuit-breaker, the combination of two independent switches electrically connected in series, and a single means opening both switches when the current in the circuit exceeds a predetermined maximum.

16. An electric-circuit breaker having in combination an arm carrying loosely-mounted contact-blades, a stationary slotted contact having rigid walls between which said blades are adapted to enter, said arm being actuated to fly forward through spring-pressure, a latch for holding said arm in the normal position, and means for releasing said latch.

17. An electric-circuit breaker having in combination an arm carrying loosely-mounted contact-blades, a stationary slotted contact having rigid walls between which said blades are adapted to enter, said arm being actuated to fly forward through spring-pressure, a latch for holding said arm in the normal position, and an electroresponsive device operating under abnormal conditions to disengage said latch.

18. An electric-circuit breaker having in combination an arm carrying loosely-mounted contact-blades, a stationary slotted contact having rigid walls between which said blades are adapted to enter, said arm being actuated to fly forward through spring-pressure, a latch for holding said arm in the normal position, a device for imparting a blow to said arm when the latch is disengaged, and an electroresponsive device operating under abnormal conditions to disengage said latch.

19. In an electric switch, the combination of a stationary slotted contact member, and a movable member having one or more blades adapted to enter said slots, each blade comprising a plurality of loosely-mounted contact-plates with spreading devices between them.

20. In an electric switch, the combination of a stationary slotted contact member, and a movable member having one or more blades adapted to enter said slots, each blade comprising a plurality of loosely-mounted flexible contact-plates with spreading devices between them.

21. In an electric switch, the combination of a stationary slotted contact member, and a movable member having one or more blades adapted to enter said slots, each blade comprising a pair of loosely-mounted contact-plates with a spreading device between each pair of plates.

22. In an electric switch, the combination of a stationary slotted contact member, and a movable member having one or more blades adapted to enter said slots, each blade comprising a pair of loosely-mounted flexible contact-plates with a spreading device between each pair of plates.

23. In an electric-circuit breaker such as described, the contact-making parts consisting of loosely-mounted blades with spreading devices between them, and slotted metal blocks for the blades to enter, in combination with an electroresponsive means to open said contacts.

24. The combination of arms having contact-blades loosely mounted thereon, the blades being arranged in pairs with spreading devices between them, slotted blocks or parts for the blades to enter, two blades in each slot, and automatic means for withdrawing the blades from the slots simultaneously, as described.

25. The combination of pivoted arms having contact-blades loosely mounted thereon, the blades being arranged in pairs with spreading devices between them, slotted blocks or parts for the blades to enter, two blades in each slot, and electroresponsive means controlling the withdrawal of the blades from the slots simultaneously, as described.

26. The combination of pivoted arms having contact-blades loosely mounted thereon, the blades being arranged in pairs with spreading devices between them, slotted blocks or parts for the blades to enter, two blades in each slot, and electromagnetic means controlling the withdrawal of the blades from the slots simultaneously, as described.

27. A circuit-breaker of the character herein described, consisting of three independent parts, namely, two independently-operated switches or switch members, and an electroresponsive device for controlling said switches simultaneously or independently of each other.

28. A circuit-breaker of the character herein described, consisting of three independent parts, namely, two independently-operated switches or switch members adapted to be connected in series between a source of energy and a translating device, and an electroresponsive device for controlling said switches simultaneously or independently of each other.

29. In an automatic circuit-breaker, the combination of one or more stationary contact members, a movable spring-actuated switch member, a spring-actuated operating-handle for closing the switch, a locking device for holding the operating-handle in the closed position of the switch, an electroresponsive device for controlling said locking device to release the operating-handle, and means on said operating-handle whereby upon its release a blow will be imparted to the switch to facilitate the opening movement of the switch.

30. In an automatic circuit-breaker, the combination with the stationary and movable contact members, of a pivoted and independently-movable operating-handle for moving the movable switch member to its closed position, a spring placed under tension by the closing movement of the operating-handle and tending to drive the operating-handle to its initial position, a catch for holding said operating-handle against the pressure of said spring, electroresponsive means for automatically releasing said operating-handle, and means on said operating-handle whereby when the handle is released the movement imparted to it by the spring will first impart a blow to the movable switch member and then effect the opening of the switch.

31. In an automatic circuit-breaker, the combination with the stationary and movable contact members, of a pivoted and independently-movable operating-handle for moving the movable switch member to its closed position, a spring placed under tension by the closing movement of the operating-handle and tending to drive the operating-handle to its initial position, a catch for holding said operating-handle against the pressure of said spring, a second spring placed under tension by the closing movement of the movable switch member and tending to drive said member away from the stationary contacts, electroresponsive means for automatically releasing said operating-handle, and means on said operating-handle whereby when the handle is released the movement imparted to it by its spring will first impart a blow to the movable switch and the combined action of both springs will effect the final opening of the switch.

32. A multipolar circuit-breaker, comprising a number of switches, each of which is capable of independent operation to open or close a circuit, and automatic means for opening all of the switches.

33. In a multipolar circuit-breaker, the combination of a number of switches, each of which is capable of independent operation to open or close a circuit, with a common tripping device acting to open all of the circuits, and a coil controlling the action of the trip.

34. In a circuit-breaker, the combination of a number of switches in different leads or wires, each capable of independent operation, with an overload or series coil, an armature, and a device actuated by the armature for simultaneously releasing all of the switches to open their circuit, leaving them free to close the circuit successively or simultaneously, as may be desired.

35. In a double-pole circuit-breaker, the combination of two switches having no mechanical connection, one in each side of the circuit, automatic means for simultaneously opening the switches at desired times, and means permitting their closure successively or simultaneously.

36. The combination of two independently-operated switches in the two sides of a circuit, a tripping device for each switch, an armature for simultaneously actuating both tripping devices, and a series coil in one side only of the line.

37. The combination, with an electric circuit, of two circuit-breakers responsive to the same load connected with opposite sides of the circuit and located adjacent to one another, and magnetic means responsive to a predetermined variation of current strength, for opening the circuit at one circuit-breaker if a current variation exists when the other is closed.

38. In an automatic circuit-breaker, two circuit-interrupting devices in series relation, provided with independent means of operation and adapted for inclusion in an electric circuit so as to be under the control of the same operator, each circuit-interrupting device being automatically responsive to the same predetermined increase of current strength, whereby the circuit will be opened at one point if an overload exists when it is closed at the other point.

39. The combination with an electric circuit, of two automatic magnetic circuit-breakers connected in series relation, provided with independent closing means and placed in proximity to one another, each circuit-interrupting device being responsive to a determinate variation of current strength, whereby the circuit will be opened at the switch of the circuit-breaker if a determinate strength of current exists when the other is closed.

H. WARD LEONARD.
HENRY PRICE BALL.

Witnesses:
R. H. MANSFIELD, Jr.,
C. E. CARPENTER.